United States Patent [19]

Murray

[11] Patent Number: 4,574,029
[45] Date of Patent: Mar. 4, 1986

[54] APPARATUS FOR FORMING CONCAVE TAPE WRAPPED COMPOSITE STRUCTURES

[75] Inventor: William J. Murray, Midlothian, Tex.

[73] Assignee: LTV Aerospace and Defense Company, Dallas, Tex.

[21] Appl. No.: 604,490

[22] Filed: Apr. 27, 1984

[51] Int. Cl.⁴ ............................................. B32B 31/04
[52] U.S. Cl. ................................... 156/500; 156/358; 156/361; 156/363; 156/574; 156/577
[58] Field of Search ............... 156/358, 361, 363, 500, 156/574, 577

[56] References Cited

U.S. PATENT DOCUMENTS

| | | | |
|---|---|---|---|
| 3,775,219 | 11/1973 | Karlson et al. | 156/363 |
| 4,133,711 | 1/1979 | August et al. | 156/500 |
| 4,292,108 | 9/1981 | Weiss et al. | 156/259 |
| 4,351,688 | 9/1982 | Weiss et al. | 156/358 |
| 4,419,170 | 12/1983 | Blad | 158/361 |
| 4,461,669 | 7/1984 | Dontscheff | 156/574 |
| 4,491,493 | 1/1985 | Keaston | 156/353 |

Primary Examiner—Caleb Weston
Attorney, Agent, or Firm—James M. Cate; S. S. Sadacca

[57] ABSTRACT

An apparatus is disclosed for forming concave tape wrapped composite structures. The apparatus utilizes a mold having a cylindrical concave surface with a mounting plate mounted for rotation at each end thereof about a point on a longitudinal axis of the concave surface. A longitudinal shaft is mounted to each mounting plate a selected distance from the longitudinal axis and extends parallel thereto. A tape dispenser carriage is mounted to the longitudinal shaft and is movable along the length thereof. A radial shaft is mounted through the tape dispenser carriage such that the longitudinal axis of the radial shaft passes through the longitudinal axis of the concave surface and along a radius of the concave surface. A composite tape dispenser is mounted at the lower end of the radial shaft and in a preferred embodiment of the present invention a rack and pinion gear system is utilized in conjunction with both the longitudinal shaft and the radial shaft to allow tape to be applied to the entire concave surface of the mold.

23 Claims, 2 Drawing Figures

APPARATUS FOR FORMING CONCAVE TAPE WRAPPED COMPOSITE STRUCTURES

BACKGROUND OF THE INVENTION

This invention relates to apparatus for manufacturing laminated composite structures in general, and in particular to methods and apparatus for manufacturing composite structures utilizing layers of composite tape. Still more particularly, this invention relates to apparatus for forming concave tape wrapped composite structures.

Laminated composite structures are currently employed in a variety of applications in which their light-weight, high strength, and other physical characteristics are of benefit. In recent years there has been an increasing interest in the use of composite structures in the place of metal components of aircraft, ground vehicles, and structural members in which a high strength-to-weight ratio is of importance. Because of fuel conservation considerations, for example, the utilization of composite structures as components in aircraft is increasing, and major portions of automobile bodies and aircraft components have been constructed of composites. Typically, such composite structures comprise a plastic matrix, of a material such as epoxy, reinforced with a fibrous cloth or tape of a material such as boron, graphite or Fiberglass. The present invention relates to the manufacture of such composite structures by tape laying procedures, i.e., the manufacture of such structures by the placement on a mold of successive layers of resin-impregnated tapes.

In many applications, structural members are required to sustain greater loads at particular locations and along particular axes than at other locations or axes. The tape lay-up process is used advantageously to form such structures because the tapes can be oriented to provide maximum strength at the locations and along the axes of greatest stress, thus reducing the weight of the structure by permitting the use of less material in areas not subject to such concentrated loads. The tapes have substantially unidirectional filaments impregnated with uncured or partially cured resin and are generally adhered to a mold as parallel, mutually adjacent lengths or strips. The lengths of tapes of successive layers advantageously extend in differing directions. Successive layers are laid over the mold until a desired thickness is attained, after which the work piece is cured to form a composite structure having reinforcing fibers extending in appropriate directions for sustaining the loads anticipated for the particular structure.

While the advantages of such tape laying methods are known, several limitations and difficulties have in the past tended to limit their general use. One such limitation involves the manufacture of round or circular structures such as an aircraft fuselage member. These structures present difficulties to known composite tape lay-up tachniques due to the mold techniques currently utilized. As those skilled in the art will appreciate, a simple cylindrical mold of constant circumstance can be easily wrapped to form a composite structure. Composite tape can be applied longitudinally, radially and at a constant angle from the normal (typically a positive or negative forty-five degrees). The uncured composite tape can then be cut from the mold, cured and rejoined to form a circular or cylindrical composite structure. A major disadvantage to this technique is the fact that the outer surface of a structure formed with tape in the aforementioned manner is quite rough and not well suited to supersonic aircraft applications. In order to solve this problem it is necessary to utilize molds having concave surfaces and to lay composite tape into the mold. In this manner, the rough last layers of composite tape are on the interior of the finished composite product and the smooth, mold side becomes the exterior when the two halves of a circular or cylindrical structure are joined together.

While the utilization of this concave mold surface technique solves the problem of aerodynamic smoothness for composite structures, it raises new problems with the necessity of accurately laying composite tape inside a concave mold. Several highly complex robotic tape application devices have been proposed for this procedure; however, the complex nature of these systems results in highly costly and complex systems which are difficult to align and which require complicated computerized control systems. Thus, it should be apparent that existing methods and apparatus for forming concave tape wrapped composite structures are highly complex and expensive or are unsatisfactory from an aerodynamic standpoint. Examples of complex tape application devices can be seen in U.S. Pat. Nos. 4,133,711 and 3,775,219.

SUMMARY OF THE INVENTION

It is therefore one object of the present invention to provide an improved apparatus for forming concave tape wrapped composite structures.

It is another object of the present invention to provide an improved apparatus for forming tape wrapped composite structures which can be utilized to form highly aerodynamic structures.

It is another object of the present invention to provide an improved apparatus for forming concave tape wrapped composite structures may be simply and easily maintained.

It is still another object of the present invention to provide an improved apparatus for forming concave tape wrapped composite structures which does not require substantial set-up or adjustment.

The foregoing objects are achieved as is now described. The apparatus of the present invention utilizes a mold having a cylindrical concave surface with mounting plates mounted for rotation at each end thereof about a point on a longitudinal axis of the concave surface. A longitudinal shaft is mounted to each mounting plate a selected distance from the longitudinal axis and extends parallel thereto. A tape dispenser carriage is mounted to the longitudinal shaft and is movable along the length thereof. A radial shaft is mounted through the tape dispenser carriage such that the longitudinal axis of the radial shaft passes through the longitudinal axis of the concave surface and along a radius of the concave surface. A composite tape dispenser is mounted at the lower end of the radial shaft and in a preferred embodiment of the present invention a rack and pinion gear system is utilized on conjunction with both the longitudinal shaft and the radial shaft to allow tape to be applied to the entire concave surface of the mold.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
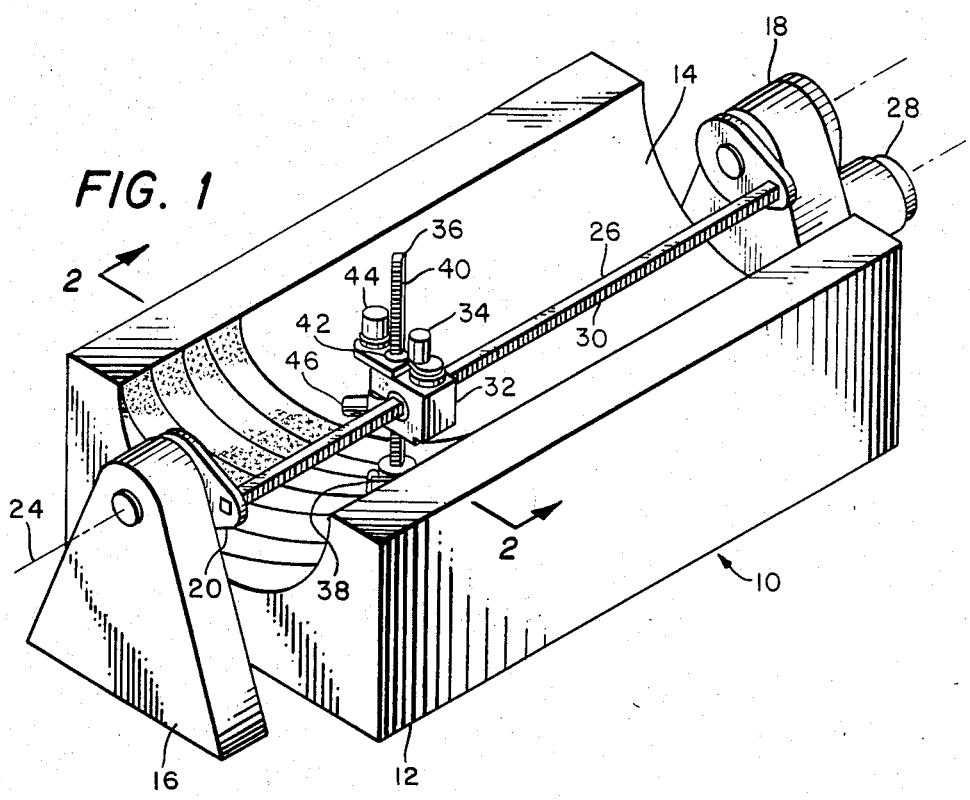
FIG. 1 is a perspective view of the novel tape wrapped composite structure manufacturing apparatus of the present invention.

With reference now to the figures and in particular with reference to FIG. 1, there is depicted a perspective view of novel tape wrapped composite structure manufacturing apparatus 10 of the present invention. As can be seen, apparatus 10 includes a mold 12 which may be formed of metal, wood or any other suitable material. Mold 12 includes an elongate cylindrical concave surface 14 which forms one half of an ordinary right cylinder. Of course, those skilled in the art will appreciate upon reference to this specification that this technique may be applied to spherical concave surfaces, conical concave surfaces, frustoconical concave surfaces or any other type of concave surface which has a longitudinal axis.

Positioned at either end of mold 12 are support members 16 and 18 which serve to support rotatable mounting plates 20 and 22 respectively. Rotatable mounting plates 20 and 22 are each positioned to rotate precisely about a point on longitudinal axis 24 of concave surface 14. Longitudinal shaft 26 is mounted to rotatable mounting plates 20 and 22 and offset from longitudinal axis 24 by a selected distance. As the relative mounting position of longitudinal shaft 26 with respect to longitudinal axis 24 is substantially identical on mounting plate 20 and mounting plate 22, longitudinal shaft 26 will therefore rotate about longitudinal axis 24 at the selected distance therefrom and parallel thereto.

As can be seen in FIG. 1, rotatable mounting plate 22 is preferably coupled via a gear train (not shown) within support member 18, to a controllable electric motor 28. It should be apparent to those ordinarily skilled in the art from an examination of FIG. 1, that rotatable mounting plate 20 may also be coupled to controllable electric motor 28 through a gear train with end support member 16 and the base of apparatus 10. In an alternate embodiment, if longitudinal shaft 26 is not long enough to generate torque problems, rotational mounting plate 20 may be simply mounted in a freely rotating bearing and driven by longitudinal shaft 26 and rotatable mounting plate 22.

Disposed along one edge of longitudinal shaft 26 is rack gear 30. A movable tape dispenser carriage 32 is preferably mounted to longitudinal shaft 26 and includes a pinion gear (not shown) which engages rack gear 30. The pinion gear is coupled to controllable electric motor 24 which may be energized to selectively rotate the pinion gear and move tape dispenser carriage 32 along the length of longitudinal shaft 26.

Mounted within tape dispenser carriage 32 is radial shaft 36. Radial shaft 36 is both rotatably and axially movable within tape dispenser carriage 32 and serves to mount composite tape dispenser 38. Composite tape dispenser 38 is preferably a known composite tape dispenser such as the tape dispenser depicted in U.S. patent application Ser. No. 06/276,441, filed June 22, 1981 and assigned to the assignee herein. An important feature of the present invention is the mounting point of radial shaft 36. It is important that radial shaft 36 be mounted in tape dispenser carriage 32 and separated from longitudinal shaft 26 by substantially the exact distance separating longitudinal shaft 26 from longitudinal axis 24. In this manner, the longitudinal axis of radial shaft 36 will be normal to and pass through longitudinal axis 24 and radial shaft 36 will lie along a radius of concave surface 14 regardless of the position of tape dispenser carriage 32 and radial shaft 36.

As is illustrated, radial shaft 36 is mounted through a rotatable coupling 42 which may be selectively positioned by energizing controllable electric motor 34. In this manner, radial shaft 36 may be simply and accurately rotated about its longitudinal axis. Additionally, radial shaft 36 includes a rack gear 40 which is disposed along one edge thereof. A fourth controllable electric motor 46 drives a second pinion gear (not shown) within tape dispenser carriage 32 which engages rack gear 40 in a manner well known in the gear art. Selective energization of controllable electric motor 46 may then be utilized to selectively raise and lower radial shaft 36 along its longitudinal axis.

Thus, by selective control of controllable electric motors 28, 34, 44 and 46 it will be possible to simply and accurately control the movement of composite tape dispenser 38 in order to lay a desired pattern of composite tape 48 onto concave surface 14 of mold 12. As those skilled in the art will appreciate, composite tape 48 is preferably a pre-impregnated fibrous tape which includes a backing strip. The fibrous tape, for example, is a tape of suitable width formed of unidirectional graphite fibers which has been impregnated with uncured epoxy resin. The backing strip typically utilized may be formed of waxed paper of approximately seventy pounds per square foot. Such tapes are typically provided in rolled form on cardboard spools for applications such as that depicted in FIG. 1.

Figure 2:
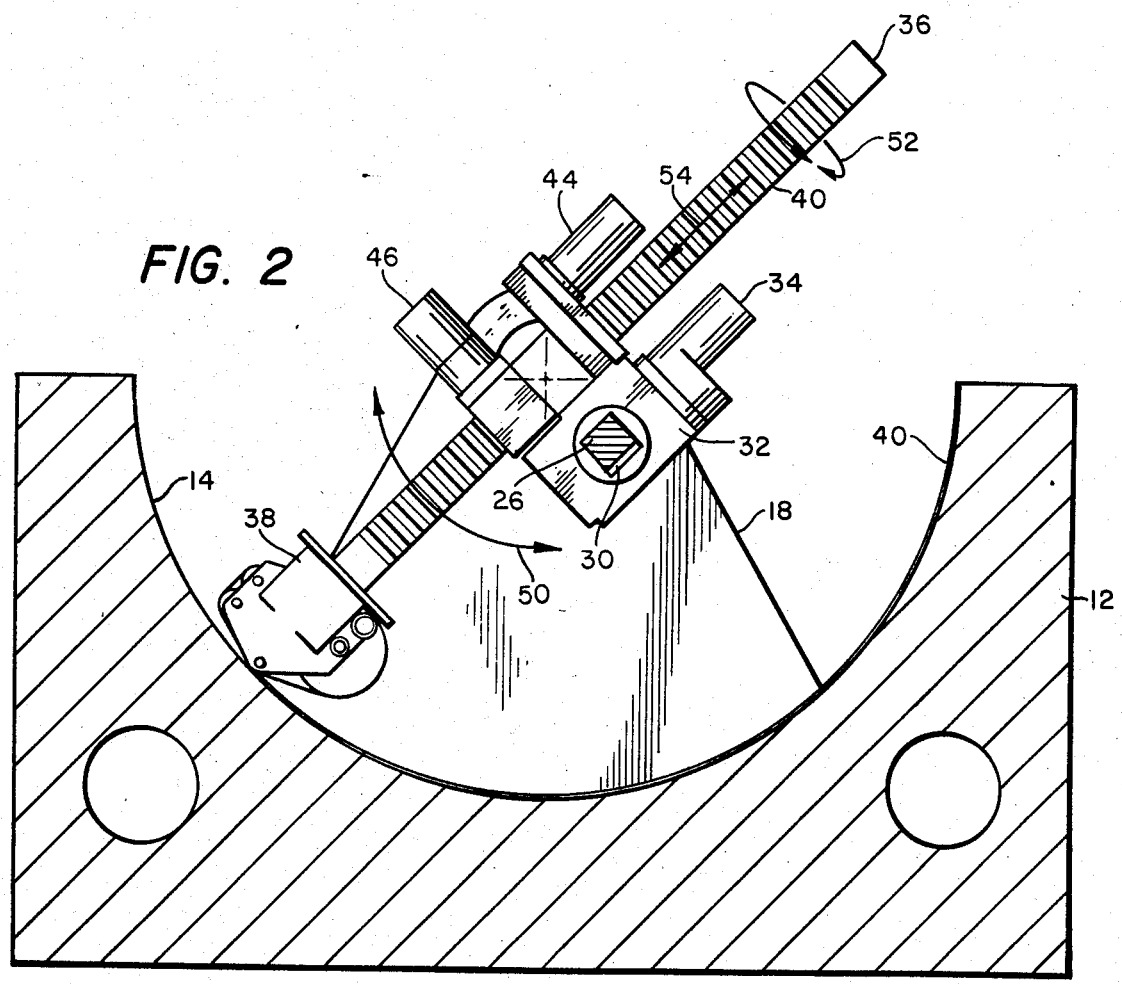
FIG. 2 is a sectional view of the novel apparatus of FIG. 1 taken along line 2—2 of FIG. 1.

Referring now to FIG. 2, there is depicted a sectional view of novel apparatus 10 taken along line 2—2 of FIG. 1. This view is particularly useful in illustrating the range of movement through which composite tape dispenser 38 may be positioned utilizing the apparatus of the present invention. Referring briefly to FIG. 1, the reader will recall that tape dispenser carriage 32 may be moved along the length of longitudinal shaft 26 by selective energization of controllable electric motor 34 and engagement of its associated pinion gear with rack gear 30.

The range of motion of radial shaft 36, and thus composite tape dispenser 38, can be seen to include three separate motions. Composite tape dispenser 38 can be positioned along the surface of concave surface 14 by movement of rotatable mounting plate 22 utilizing controllable electric motor 28 as depicted at arrow 50. This movement alone will allow composite tape dispenser 38 to lay a radial band of composite tape around the circumference of concave surface 14.

Radial shaft 36 may also be rotated about its longitudinal axis by selective energization of controllable electric motor 44 and movement of rotatable coupling 42 (now shown) as seen at arrow 52, and together with movement along longitudinal shaft 26 may be utilized to lay an axial band of composite tape along the longitudinal surface of concave surface 14.

Finally, radial shaft 36 may be raised and lowered along its longitudinal shaft by the action of controllable electric motor 46 and its associated pinion gear engaging rack gear 40, as depicted by arrow 54. This movement, when coupled with the remaining movements permitted will allow composite tape dispenser 38 to lay skewed layers of composite tape 48 along the surface of concave surface 14.

Those ordinarily skilled in the art should appreciate that the mechanical simplicity of the foregoing apparatus will readily permit it to be controlled by a simple microprocessor based system which can be utilized to operate controllable electric motors 28, 34, 44 and 46. In this manner, composite tape dispenser 38 may be simply and reliably utilized to lay composite tape within a composite surface without resorting to complex robotic tape applicators which require extensive alignment and complex electronic control systems.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. An apparatus for manufacturing concave composite tape structures comprising:
   a mold having a concave surface;
   at least one mounting plate rotatably mounted at one end of said mold, said mounting plate mounted for rotation about a point on a longitudinal axis of said concave surface;
   a longitudinal shaft mounted to said at least one mounting plate, said longitudinal shaft mounted to a point on said at least one mounting plate which is displaced a selected distance from said longitudinal axis of said concave surface;
   a tape dispenser carriage movably mounted to said longitudinal shaft;
   a movable radial shaft mounted to said tape dispenser carriage, said radial shaft mounted said selected distance from said longitudinal shaft wherein the longitudinal axis of said radial shaft extends through said longitudinal axis of said concave surface; and
   a composite tape dispenser mounted to said radial shaft for applying composite tape to said concave surface.

2. The apparatus for manufacturing concave composite tape structures according to claim 1 wherein said at least one mounting plate is coupled to a controllable electric motor for rotating said at least one mounting plate.

3. The apparatus for manufacturing concave composite tape structures according to claim 1 wherein said eccentrically mounted longitudinal shaft includes a rack gear disposed along one side thereof.

4. The apparatus for manufacturing concave composite tape structures according to claim 3 wherein said tape dispenser carriage includes a first pinion gear mounted therein for engagement with said rack gear disposed along said eccentrically mounted longitudinal shaft wherein said tape dispenser carriage may be moved along said longitudinal shaft by selective rotation of said first pinion gear.

5. The apparatus for manufacturing concave composite tape structures according to claim 1 further including means for rotating said radial shaft around the longitudinal axis thereof.

6. The apparatus for manufacturing concave composite tape structures according to claim 5 wherein said radial shaft includes a rack gear disposed along one edge thereof.

7. The apparatus for manufacturing concave composite tape structures according to claim 6 wherein said tape dispenser carriage includes a second pinion gear mounted therein for engagement with said rack gear disposed along said radial shaft wherein said radial shaft may be moved toward and away from said concave surface by selective rotation of said second pinion gear.

8. An apparatus for manufacturing concave composite tape structures comprising:
   a mold having a concave surface;
   a mounting plate rotatably mounted at each end of said mold, each of said mounting plates mounted for rotation about a point on a longitudinal axis of said concave surface;
   an eccentrically mounted longitudinal shaft mounted between said mounting plates, said eccentrically mounted longitudinal shaft mounted to a point on each of said mounting plates which is displaced a selected distance from said longitudinal axis of said concave surface;
   a tape dispenser carriage movably mounted to said longitudinal shaft;
   a movable radial shaft mounted to said tape dispenser carriage, said radial shaft mounted said selected distance from said longitudinal shaft wherein the longitudinal axis of said radial shaft extends through the longitudinal axis of said concave surface; and
   a composite tape dispenser mounted to said radial shaft for applying composite tape to said concave surface.

9. The apparatus for manufacturing concave composite tape structures according to claim 8 wherein at least one of said mounting plates rotatably mounted at each end of said mold is coupled to a controllable electric motor for rotating said at least one mounting plate.

10. The apparatus for manufacturing concave composite tape structures according to claim 8 wherein said mounting plates rotatably mounted at each end of said mold are coupled together for synchronous rotation.

11. The apparatus for manufacturing concave composite tape structures according to claim 8 wherein said eccentrically mounted longitudinal shaft includes a rack gear disposed along one side thereof.

12. The apparatus for manufacturing concave composite tape structures according to claim 11 wherein said tape dispenser carriage includes a first pinion gear mounted therein for engagement with said rack gear disposed along said eccentrically mounted longitudinal shaft wherein said tape dispenser carriage may be moved along said longitudinal shaft by selective rotation of said first pinion gear.

13. The apparatus for manufacturing concave composite tape structures according to claim 8 further including means for rotating said radial shaft around the longitudinal axis thereof.

14. The apparatus for manufacturing concave composite tape structures according to claim 13 wherein said radial shaft includes a rack gear disposed along one edge thereof.

15. The apparatus for manufacturing concave composite tape structures according to claim 14 wherein said tape dispenser carriage includes a second pinion gear mounted therein for engagement with said rack gear disposed along said radial shaft wherein said radial shaft may be moved toward and away from said concave surface by selective rotation of said second pinion gear.

16. An apparatus for manufacturing concave composite tape structures comprising:
- a mold having a generally elongate cylindrical concave surface;
- a mounting plate rotatably mounted at each end of said mold, each of said mounting plates mounted for rotation about a point on the longitudinal axis of said concave surface;
- an eccentrically mounted longitudinal shaft mounted between points on said mounting plates which are displaced a selected distance from said longitudinal axis of said generally elongate cylindrical concave surface;
- a tape dispenser carriage movably mounted to said longitudinal shaft;
- a movable radial shaft mounted to said tape dispenser carriage, said radial shaft mounted said selected distance from said longitudinal shaft wherein the longitudinal axis of said radial shaft extends through said longitudinal axis of said concave surface; and
- a composite tape dispenser mounted to said radial shaft for applying composite tape to said generally elongate cylindrical concave surface.

17. The apparatus for manufacturing concave composite tape structures according to claim 16 wherein at least one of said mounting plates rotatably mounted at each end of said mold is coupled to a controllable electric motor for rotating said at least one mounting plate.

18. The apparatus for manufacturing concave composite tape structures according to claim 16 wherein said mounting plate rotatably mounted at each end of said mold are coupled together for synchronous rotation.

19. The apparatus for manufacturing concave composite tape structures according to claim 16 wherein said eccentrically mounted longitudinal shaft includes a rack gear disposed along one side thereof.

20. The apparatus for manufacturing concave composite tape structures according to claim 19 wherein said tape dispenser carriage includes a first pinion gear mounted therein for engagement with said rack gear disposed along said eccentrically mounted longitudinal shaft wherein said tape dispenser carriage may be moved along said longitudinal shaft by selective rotation of said first pinion gear.

21. The apparatus for manufacturing concave composite tape structures according to claim 16 further including means for rotating said radial shaft around the longitudinal axis thereof.

22. The apparatus for manufacturing concave composite tape structures according to claim 21 wherein said radial shaft includes a rack gear disposed along one edge thereof.

23. The apparatus for manufacturing concave composite tape structures according to claim 22 wherein said tape dispenser carriage includes a second pinion gear mounted therein for engagement with said rack gear disposed along said radial shaft wherein said radial shaft may be moved toward and away from said concave surface by selective rotation of said second pinion gear.

* * * * *